Patented Apr. 21, 1931

1,801,713

UNITED STATES PATENT OFFICE

WILHELM BAUER, OF WIESDORF-ON-THE-RHINE, GERMANY, ASSIGNOR TO GENERAL ANILINE WORKS, INC., OF NEW YORK, N. Y., A CORPORATION OF DELAWARE

NEW THIONAPHTHENE-INDOLEINDIGO DYESTUFFS

No Drawing. Application filed May 9, 1929, Serial No. 361,339, and in Germany June 12, 1928.

The present invention relates to new thionaphtheneindoleindigo dyestuffs, more particularly it relates to trihalogen-2-indole-2'-thionaphthene indigos of the general formula:

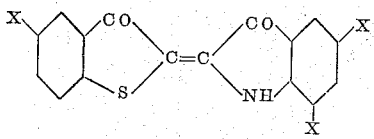

wherein the X's stand for chlorine or bromine atoms.

My new dyestuffs are obtainable by causing a 3-hydroxy-thionaphthene substituted in the 5-position by a halogen atom to react with a 5.7-dihalogen-isatin-alpha-derivative in which the alpha C-atom contains easily removable or replaceable substituents, for example halogen, a residue of the kind $=N-R$, wherein R means an aromatic nucleus, and the like.

The new trihalogen-2-indole-2'-thionaphthene indigos are valuable violet dyestuffs exerting unexpected good fastness properties, especially to chlorine, washing and light. The 5-halogen-hydroxy-thionaphthenes may be obtained in various ways, such as for instance by reacting upon chlorobenzene with chlorosulfonic acid, reducing the para-chlorobenzene sulfonic acid chloride thus obtained to 1-mercapto-4-chlorobenzene, reacting upon the latter with chloroacetic acid as to form para-chlorobenzene-thioglycolic acid and converting this compound into 5-chlorohydroxy-thionaphthene according to one of the usual methods. In an analogous manner, when starting with bromobenzene, the 5-bromo-hydroxythionaphthene can be obtained.

The condensation of the 5-halogen-hydroxythionaphthenes with the halogenizatin derivatives above mentioned may be performed in various manners, according to the kind of the isatin derivatives used. Such, for instance, when working with a 5.7-dihalogenizatin-alpha-chloride, the condensation may be effected in anhydrous chlorobenzene, advantageously while heating to temperatures of about 50–90° C. Or, when working with a 5.7-dihalogenizatin-alpha-arylide, the condensation may advantageously be effected in acetic anhydride at about 80–100° C.

The dyestuffs thus obtainable form violet crystalline powders, difficultly soluble in the usual organic solvents, soluble in strong sulfuric acid with a greenish blue coloration, yielding with hydrosulfite and caustic soda lye yellow vats from which textile-fibres are dyed clear violet shades of excellent fastness properties.

The following examples illustrate my invention, without limiting it thereto, the parts being by weight.

*Para-chlorophenyl-thioglycolic acid*

Example 1.— 10 parts of chlorobenzene are stirred into 35 parts of chlorosulfonic acid at a temperature of about 30° C. As soon as no further reaction takes place, the para-chlorobenzene sulfonic acid chloride formed is isolated by pouring the reaction mixture on to ice and sucking off. The whole amount of the sulfonic acid chloride thus obtained is then reduced by means of 36 parts of strong sulfuric acid, 80 parts of water and 20 parts of zinc powder. The mercapto compound formed during this reduction is separated by steam distillation and dissolved in a sufficient quantity of water with the addition of 7.5 parts of a caustic soda solution of about 33% strength and 6.5 parts of chloroacetic acid dissolved in water in form of its sodium salt. The reaction mixture is heated to about 80° C. After about one hour the reaction mixture is filtered and acidified with hydrochloric acid, whereby about 12 parts of para-chlorophenylioglycolic acid separate.

*5-chlorohydroxythionaphthene*

Example 2.—101 parts of para-chlorophenylthioglycolic acid are converted into the acid chloride by heating in 150 parts of anhydrous chlorobenzene with 72 parts of phosphorus trichloride at the water bath. The filtered solution of the chloride thus obtainable is now cooled to about −10° C. and 75 parts of powdered anhydrous aluminium-chloride are added, the temperature always being maintained at about −10° C. As soon as the development of hydrochloric acid slackens the temperature is slowly raised to about 40° C. until the development of hydrochloric acid has completely ceased. Now the reaction mixture is poured on to ice, the chlorobenzene is removed by steam distillation and the separating 5-chloro-hydroxythionaphthene is sucked off, washed and purified by dissolving it in dilute soda lye and repricipitating from the filtered solution by means of carbon dioxide.

*Example 3.*—305 parts of 5.7-dibromoisatin are heated with 225 parts of phosphorus-pentachloride in 3000 parts of anhydrous chlorobenzene to about 110° C. until the formation of the alpha-chloride of the dibromoisatin is complete.

The reaction mixture is then added to a solution of 200 parts of dried 5-chloro-hydroxythionaphthene in 2000 parts of anhydrous chlorobenzene while stirring at a temperature of about 80° C. After further stirring for a short time the mixture is cooled to about 50° C. and the dyestuff formed is filtered, washed and dried. It probably corresponds to the formula:

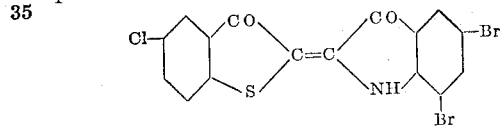

It forms a violet crystalline powder, soluble in concentrated sulfuric acid with a greenish blue coloration and dyes textile fibres from a yellow hydrosulfite vat clear violet shades of excellent fastness to chlorine, washing, light and ironing.

When using in this example instead of 200 parts of 5-chloro-hydroxythionaphthene 250 parts of 5-bromo-hydroxythionaphthene a dyestuff of nearly the same properties, but dyeing textile fibres a little more blue and brighter violet shades, is obtained.

Dyestuffs of similar properties are obtainable when replacing the isatin compound mentioned in Example 3 by equivalent quantities of for example 5.7-dichloro-isatin, 5-bromo-7-chloroisatin and the like.

I claim:

1. As new products, the vat dyestuffs of the probable general formula:

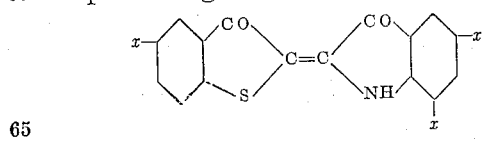

wherein *x* means a chlorine or bromine atom, said products being violet crystalline powders, dyeing textile fibres from a yellow hydrosulfite vat clear violet shades of good fastness properties, especially to chlorine, washing and light.

2. As a new product, the vat dyestuff of the probable formula:

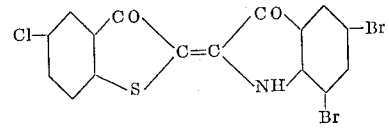

said product being a violet crystalline powder, soluble in concentrated sulfuric acid with a greenish blue coloration, dyeing textile fibres from a yellow hydrosulfite vat clear violet shades of excellent fastness properties especially to chlorine, washing, light and ironing.

In testimony whereof I have hereunto set my hand.

WILHELM BAUER. [L. S.]